(12) United States Patent
Pomaranski et al.

(10) Patent No.: US 7,664,994 B2
(45) Date of Patent: Feb. 16, 2010

(54) HIGH-AVAILABILITY CLUSTER NODE REMOVAL AND COMMUNICATION

(75) Inventors: Ken Gary Pomaranski, Roseville, CA (US); Andrew Harvey Barr, Roseville, CA (US); Kenneth N. Konesky, North Highlands, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 644 days.

(21) Appl. No.: 10/935,882

(22) Filed: Sep. 8, 2004

(65) Prior Publication Data

US 2006/0053336 A1 Mar. 9, 2006

(51) Int. Cl.
*G06F 11/00* (2006.01)
(52) U.S. Cl. .......................................... 714/47; 714/48
(58) Field of Classification Search ................... 714/47, 714/48
See application file for complete search history.

(56) References Cited

U.S. PATENT DOCUMENTS

| | | | |
|---|---|---|---|
| 6,389,551 B1 | 5/2002 | Yount | |
| 6,453,426 B1* | 9/2002 | Gamache et al. ................ | 714/4 |
| 6,502,203 B2 | 12/2002 | Barron et al. | |
| 6,609,213 B1* | 8/2003 | Nguyen et al. .................. | 714/4 |
| 6,822,874 B1* | 11/2004 | Marler ........................ | 361/752 |
| 6,947,957 B1* | 9/2005 | Lange ......................... | 707/200 |
| 7,228,462 B2* | 6/2007 | Pomaranski et al. ........... | 714/48 |
| 7,383,464 B2* | 6/2008 | Gilbert et al. .................. | 714/10 |
| 2003/0149735 A1* | 8/2003 | Stark et al. .................... | 709/208 |
| 2003/0177228 A1 | 9/2003 | Vigouroux et al. | |
| 2005/0068888 A1* | 3/2005 | Komarla et al. .............. | 370/216 |
| 2005/0188283 A1* | 8/2005 | Pomaranski et al. ........... | 714/47 |
| 2006/0015781 A1* | 1/2006 | Rothman et al. ............. | 714/100 |
| 2008/0141078 A1* | 6/2008 | Gilbert et al. .................. | 714/48 |

FOREIGN PATENT DOCUMENTS

| | | |
|---|---|---|
| GB | 2 410 406 | 7/2005 |
| JP | 2001-067330 | 3/2001 |
| WO | WO 2004/051479 A2 | 6/2004 |

OTHER PUBLICATIONS

Patent Act 1977: Search Report under Section 17 for Application No. GB 0516364.7.
"Notice of Rejection" from Japan Patent Office for Patent Application No. 2005-258992, Nov. 9, 2006, 3 sheets.

* cited by examiner

*Primary Examiner*—Paul F. Contino (57) ABSTRACT

One embodiment disclosed relates to a high-availability cluster apparatus having a plurality of computing nodes and a hardware interface configured to connect to each of said nodes. The internode connections are coupled to the hardware interface to communicate node status signals between said nodes. A node is removable from being connected to the hardware interface without interrupting a topological continuity of the internode connections. Other embodiments are also disclosed.

15 Claims, 12 Drawing Sheets

HIGH-AVAILABILITY CLUSTER NODE REMOVAL AND COMMUNICATION

CROSS-REFERENCE TO RELATED APPLICATIONS

The present application is related to U.S. patent application Ser. No. 10/764,165, entitled "Cluster Node Status Detection and Communication," filed Jan. 23, 2004 by inventors Ken G. Pomaranski and Andrew H. Barr. The present application is also related to U.S. patent application Ser. No. 10/764,198, entitled "Multi-State Status Reporting for High-Availability Cluster Nodes," filed Jan. 23, 2004 by inventors Ken G. Pomaranski and Andrew H. Barr and to U.S. patent application Ser. No. 10/764,244, entitled "Node Management in High-Availability Cluster," filed Jan. 23, 2004 by inventors Ken G. Pomaranski and Andrew H. Barr. Each of the above three patent applications are hereby incorporated by reference.

FIELD OF THE INVENTION

The present disclosure relates generally to computer networks. More particularly, the present disclosure relates to clusters of interconnected computer systems.

DESCRIPTION OF THE BACKGROUND ART

A cluster is a parallel or distributed system that comprises a collection of interconnected computer systems or servers that is used as a single, unified computing unit. Members of a cluster are referred to as nodes or systems. The cluster service is the collection of software on each node that manages cluster-related activity. The cluster service sees all resources as identical objects. Resource may include physical hardware devices, such as disk drives and network cards, or logical items, such as logical disk volumes, TCP/IP addresses, entire applications and databases, among other examples. A group is a collection of resources to be managed as a single unit. Generally, a group contains all of the components that are necessary for running a specific application and allowing a user to connect to the service provided by the application. Operations performed on a group typically affect all resources contained within that group. By coupling two or more servers together, clustering increases the system availability, performance, and capacity for network systems and applications.

Clustering may be used for parallel processing or parallel computing to simultaneously use two or more CPUs to execute an application or program. Clustering is a popular strategy for implementing parallel processing applications because it allows system administrators to leverage already existing computers and workstations. Because it is difficult to predict the number of requests that will be issued to a networked server, clustering is also useful for load balancing to distribute processing and communications activity evenly across a network system so that no single server is overwhelmed. If one server is running the risk of being swamped, requests may be forwarded to another clustered server with greater capacity. For example, busy Web sites may employ two or more clustered Web servers in order to employ a load balancing scheme. Clustering also provides for increased scalability by allowing new components to be added as the system load increases. In addition, clustering simplifies the management of groups of systems and their applications by allowing the system administrator to manage an entire group as a single system. Clustering may also be used to increase the fault tolerance of a network system. If one server suffers an unexpected software or hardware failure, another clustered server may assume the operations of the failed server. Thus, if any hardware or software component in the system fails, the user might experience a performance penalty, but will not lose access to the service.

Current cluster services include Microsoft Cluster Server (MSCS), designed by Microsoft Corporation for clustering for its Windows NT 4.0 and Windows 2000 Advanced Server operating systems, and Novell Netware Cluster Services (NWCS), among other examples. For instance, MSCS supports the clustering of two NT servers to provide a single highly available server.

Clustering may also be implemented in computer networks utilizing storage area networks (SAN) and similar networking environments. SAN networks allow storage systems to be shared among multiple clusters and/or servers. The storage devices in a SAN may be structured, for example, in a RAID configuration.

In order to detect system failures, clustered nodes may use a heartbeat mechanism to monitor the health of each other. A heartbeat is a signal that is sent by one clustered node to another clustered node. Heartbeat signals are typically sent over an Ethernet or similar network, where the network is also utilized for other purposes.

Failure of a node is detected when an expected heartbeat signal is not received from the node. In the event of failure of a node, the clustering software may, for example, transfer the entire resource group of the failed node to another node. A client application affected by the failure may detect the failure in the session and reconnect in the same manner as the original connection.

If a heartbeat signal is received from a node of the cluster, then that node is normally defined to be in an "up" state. In the up state, the node is presumed to be operating properly. On the other hand, if the heartbeat signal is no longer received from a node, then that node is normally defined to be in a "down" state. In the down state, the node is presumed to have failed.

SUMMARY

One embodiment of the invention pertains to a high-availability cluster apparatus having a plurality of computing nodes and a hardware interface configured to connect to each of said nodes. The internode connections are coupled to the hardware interface to communicate node status signals between said nodes. A node is removable from being connected to the hardware interface without interrupting a topological continuity of the internode connections.

Another embodiment pertains to a method of communicating a node status signal between nodes of a high-availability computing cluster. The node status signal is received from a first node by a first connector on a hardware interface. The node status signal is forwarded from the first connector to a second connector on the hardware interface. The node status signal is then transmitted from the second connector to a second node.

Another embodiment pertains to a hardware interface configured to communicate a node status signal between nodes of a high-availability computing cluster. The hardware interface includes a plurality of connectors and internode connections. Each connector is configured to communicate the node status signal with a corresponding node. The internode connections are configured to transmit the node status signal between the connectors in a point-to-point loop configuration.

DETAILED DESCRIPTION

I. Disadvantages of Conventional Heartbeat Technique

The conventional technique for reporting a state of a clustered node is described above. In the conventional technique, a heartbeat mechanism is used, and the node determined to be in either an "up" or a "down" state.

This conventional technique is insufficient and disadvantageous in various cases. For example, even if a target critical application is not functioning (i.e. the application is down), the node on which the application is running may still be transmitting its heartbeat signals. In that case, the cluster would still consider the node to be up, even though the critical application is down. In another example, the cluster may not receive an expected heartbeat signal from a node and so assume that the node is down. However, that node may actually be up (i.e. operating properly), and the missed heartbeat signal may instead be due to a failed interconnect.

Furthermore, the conventional technique typically utilizes existing circuitry to generate and transmit the status signals. This existing circuitry is also used for other communications within the cluster. In contrast, applicants have determined that using dedicated circuitry specifically designed to robustly generate and transmit status signals is advantageous over the conventional technique.

It turns out that the efficiency (percentage uptime) of a high-availability (HA) cluster is largely determined by the amount of time the cluster takes to recognize that one of its nodes has ceased performing useful computing or storage functions (i.e. when the node is effectively down). Once the cluster has determined that the node is effectively down, the clustering software can perform the necessary tasks to keep the rest of the nodes running with little interruption to user tasks.

However, as discussed above, the conventional technique used to determine the state of a cluster node is inaccurate in various cases. The conventional technique may result in either false (unnecessary) failovers, or in failed detects. Failed detects are where the cluster level software fails to switchover from a bad node to a good node when it should. Furthermore, the conventional technique often takes an undesirably long time to detect a down state of a node.

II. Improved Node Status Detection and Communication

Figure 1A:
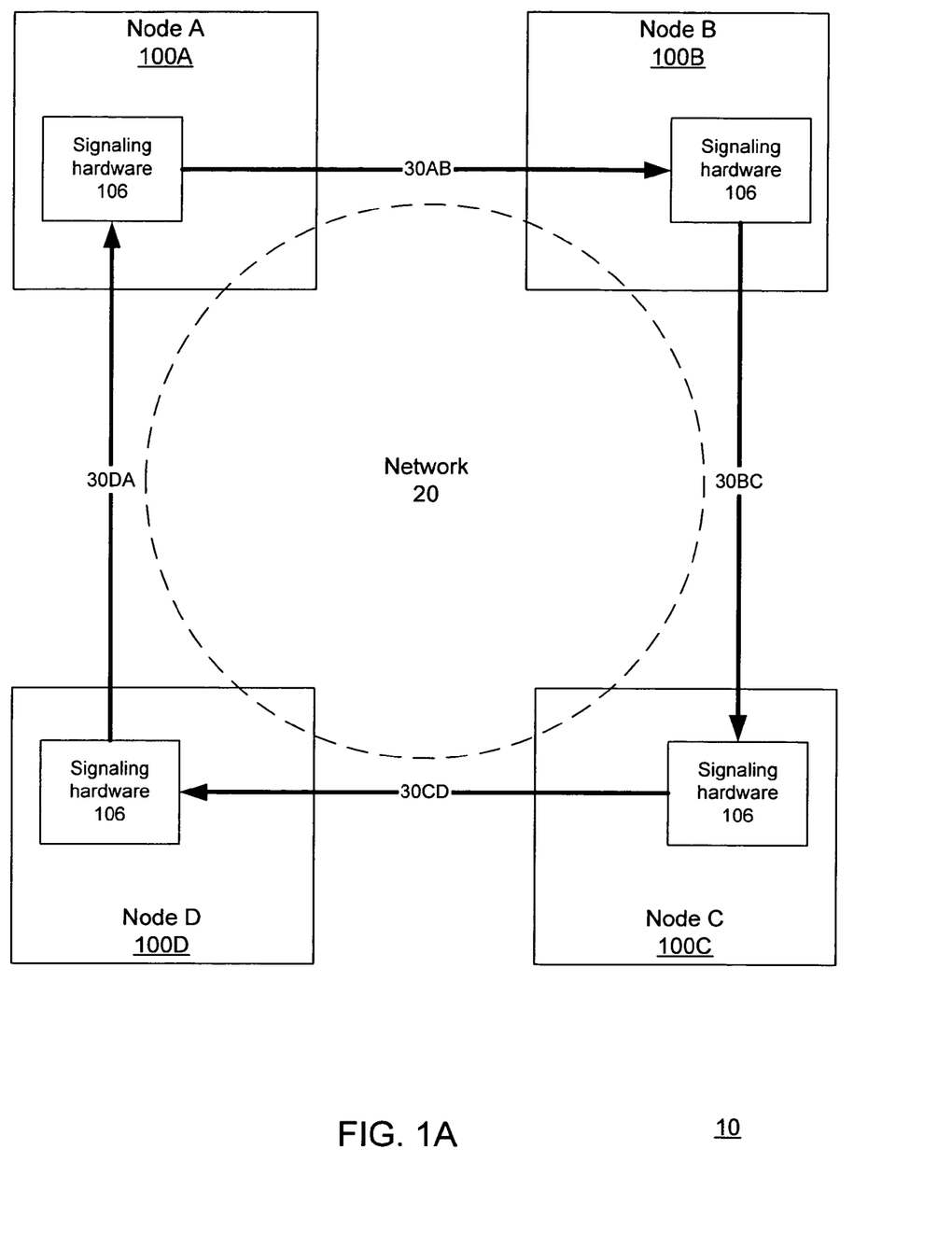
FIG. 1A is a schematic diagram depicting a representative high-availability cluster in accordance with an embodiment of the invention.

FIG. 1A is a schematic diagram depicting a representative high-availability cluster 10 in accordance with an embodiment of the invention. Four nodes 100 are shown in the diagram, but various numbers of nodes may be used within the scope of the invention.

In addition to inter-node communications via the network 20, independent inter-node communications of status information are enabled by way of a separate communication channel. As shown, the separate communication channel may, for example, utilize additional signaling hardware circuitry 106 in each node to provide point-to-point links 30 in an exemplary ring topology. In the ring topology, each node 100 may send status information over a communication link 30 to the next node 100 in the ring (going clockwise in the illustrated example) and may receive status information over another link 30 from the previous node 100 in the ring. Advantageously, such a configuration having an additional channel for status communications allows for rapid and reliable exchange of node status data.

In accordance with one embodiment, cluster-level software runs on each node 100. Each node 100 may be configured to provide the following resources to the cluster-level software. Hardware resources include a processor or processors, a memory system, disk-based or similar data storage, an interface to the network 20 interconnecting the nodes, and the dedicated signaling hardware 106 for inter-node status signaling. Software resources includes routines to perform the following tasks: updating and transmitting the status of the present node 100; monitoring and analyzing status data from another node 100 in the cluster; and taking appropriate action based on the status data from the node 100 being monitored. The computational subsystem of the node may, or may not, be running a mission-critical software application. If it is, then the mission-critical application is listed in a configuration file of the cluster-level software.

Figure 1B:
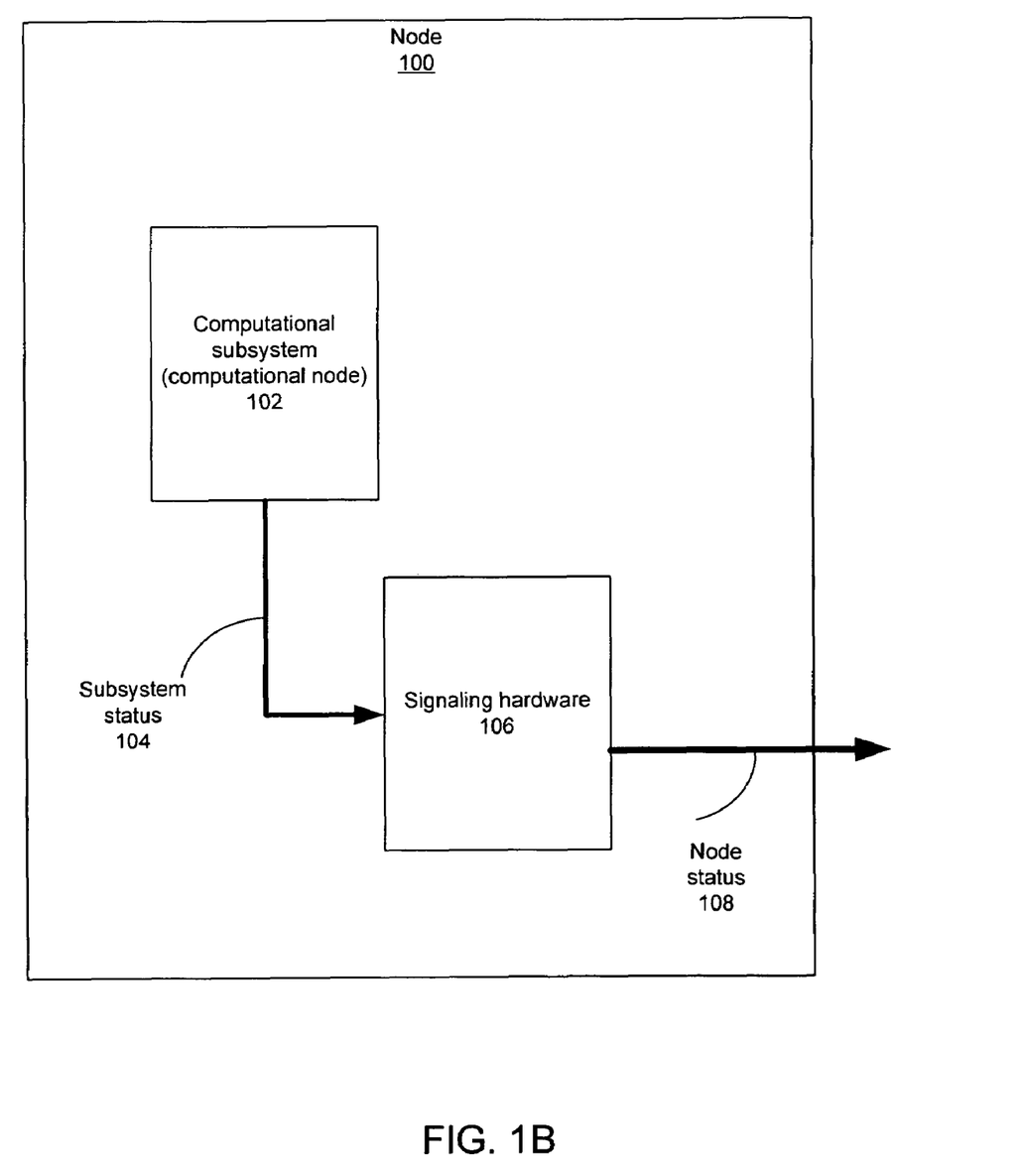
FIG. 1B is a schematic diagram depicting a node of a cluster in accordance with an embodiment of the invention.

FIG. 1B is a schematic diagram of a node 100 of a cluster in accordance with an embodiment of the invention. The node 100 includes a conventional computational subsystem 102 and signaling hardware circuitry 106. The computational subsystem 102 comprise computational elements, typically including one or more central processing units (CPUs), memory, and so on). The computational subsystem 102 generates and outputs, among other signals, a subsystem status signal 104. The signaling hardware circuitry 106 receives the subsystem status signal 104 and outputs a node status signal 108. The node status signal 108 may be output to a next node in the cluster. These signals are described further below.

Figure 2:
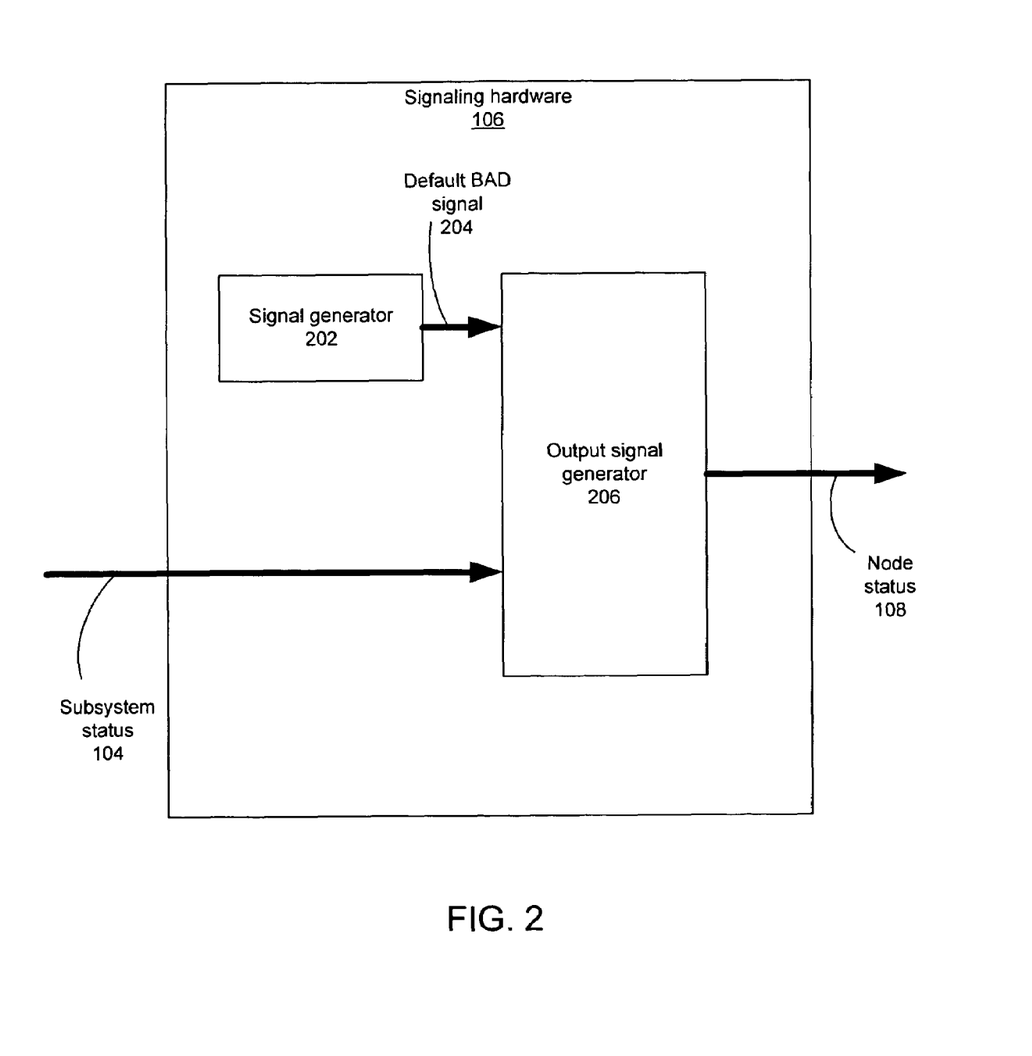
FIG. 2 is a schematic diagram of the signaling hardware in accordance with an embodiment of the invention.

FIG. 2 is a schematic diagram of the signaling hardware 106 in accordance with an embodiment of the invention. The signaling hardware 106 may include a signal generator 202 and an output signal generator 206.

Figure 4:
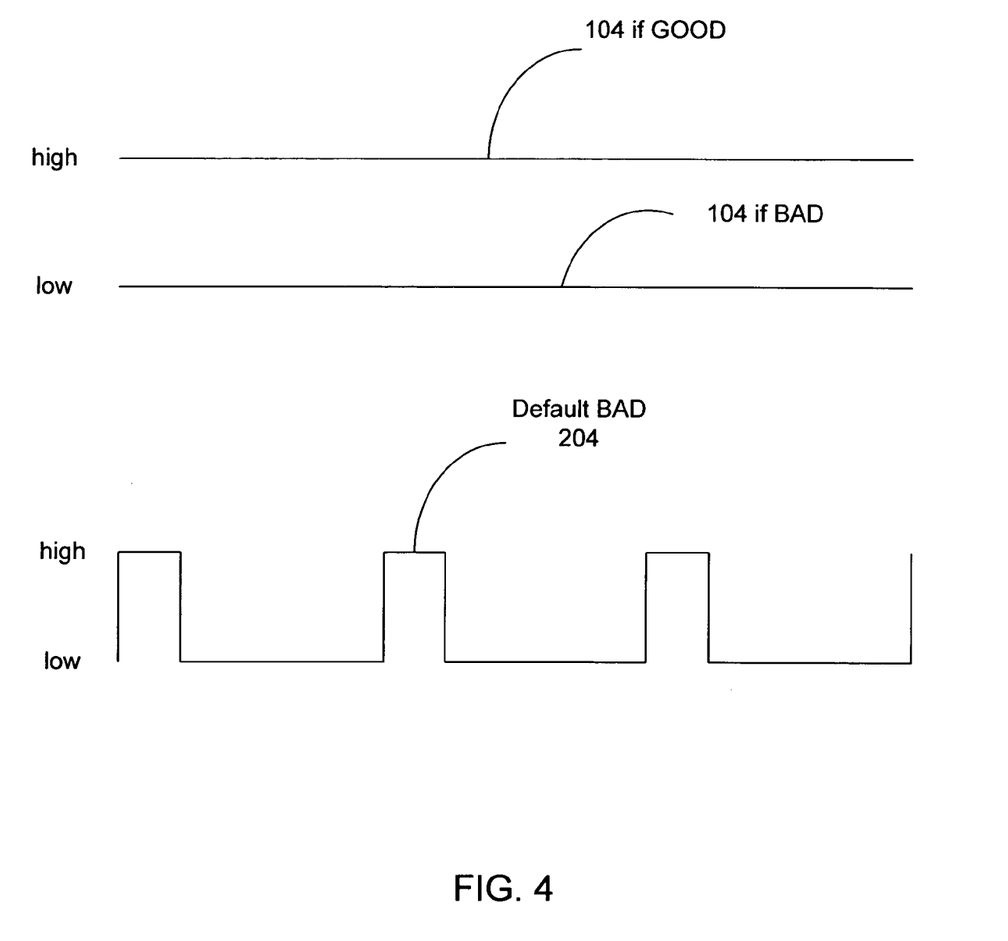
FIG. 4 depicts timing diagrams of the subsystem status signal and default BAD signal in accordance with an embodiment of the invention.

The signaling hardware 106 receives the subsystem status signal 104 from the computational node 102. Exemplary timing diagrams for the subsystem status signal 104 is shown at the top portion of FIG. 4. As depicted in FIG. 4, the subsystem status signal 104 may be in a GOOD (up) state or a BAD (down) state. For instance, the GOOD state may be represented by a high (logical 1) signal, and the BAD state may be represented by a low (logical 0) signal. If the computational subsystem 102 is functioning properly (working correctly), then the subsystem status signal 104 should be driven to the GOOD state. If the computational subsystem 102 is not functioning properly, then no GOOD state should be driven onto the subsystem status signal 104. A lack of a GOOD signal means that the system is BAD (down).

The signal generator 202 produces a default BAD (default down) signal 204. An exemplary timing diagram for the default BAD signal 204 is shown at the bottom portion of FIG. 4. As depicted in FIG. 4, the default BAD signal 204 comprises an asymmetrical periodic signal (not just a logical level). For instance, as illustrated, the default BAD signal 204 may comprise an asymmetrical toggling pattern or pulse-modulated signal. The toggling pattern shown in FIG. 4 is just an example showing one possibility. Such a toggling pattern may be generated using various electronic circuitry that is known to those of skill in the art.

The output signal generator 206 is configured to receive both the default BAD signal 204 and the subsystem status signal 104. The output signal generator 206 uses these two signals to generate and output the node status signal 108.

Figure 3:
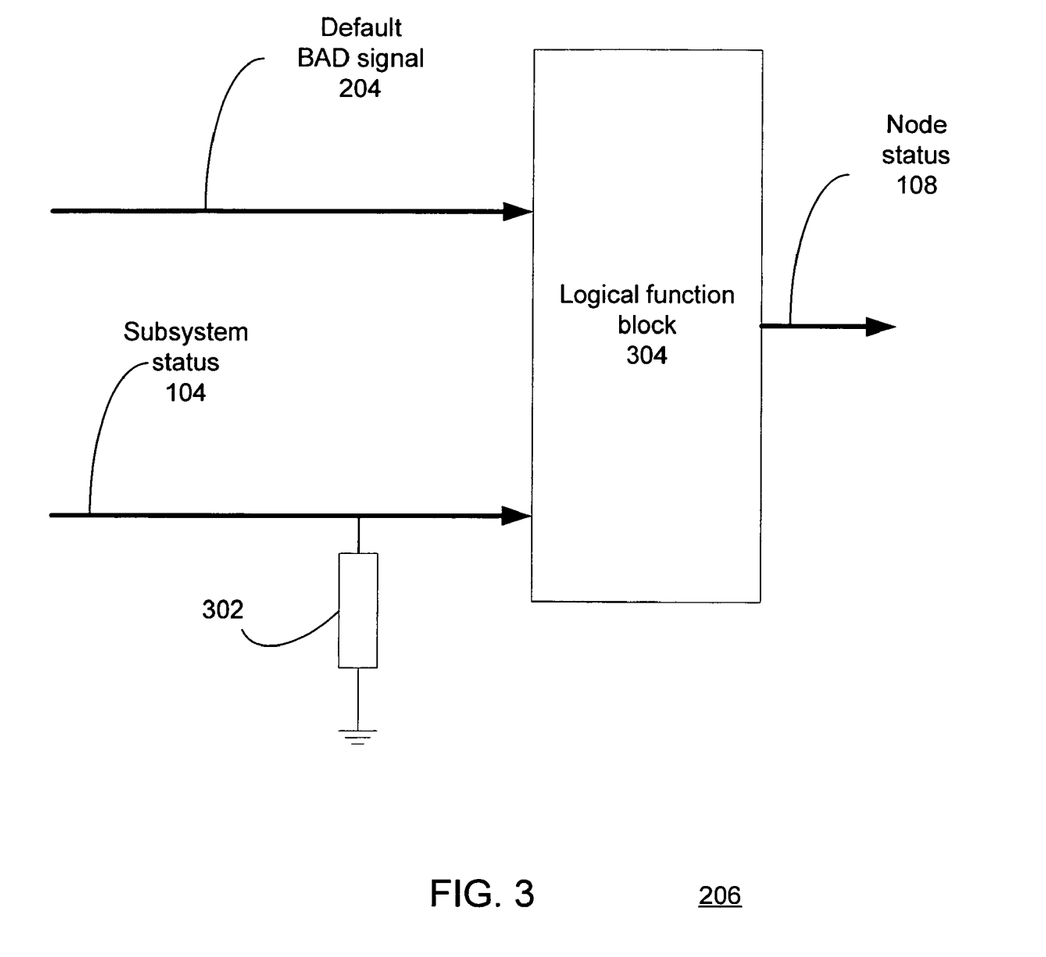
FIG. 3 is a schematic diagram of the output signal generator in accordance with an embodiment of the invention.

FIG. 3 is a schematic diagram of the output signal generator 206 in accordance with an embodiment of the invention. The output signal generator 206 may include a pull-down element 302 and a logical function block 304.

As shown in FIG. 3, the pull-down element 302 is coupled to the line receiving the subsystem status signal 104. When a high level (GOOD in this embodiment) is not driven from the computational subsystem 102, then the pull-down element 302 forces a low level (BAD in this embodiment) onto the line. Hence, the subsystem status signal 104 is advantageously pulled to a level corresponding to a BAD state even if the computational subsystem 102 does not produce any signal.

In an alternate implementation, the low level for the subsystem status signal 104 may correspond to a GOOD state, and the high level may correspond to a BAD state. In that case, a pull-up element may be used to achieve this advantageous effect. Pull-down and pull-up circuit elements (voltage-level pulling elements) are known to those of skill in the pertinent art.

As depicted in FIG. 3, the logical function block 304 receives the default BAD signal 204 along with the subsystem status signal 104. In accordance with one embodiment, the logical function block 304 may comprise an exclusive-or (XOR) gate. In other embodiments, different functions may be utilized.

Figure 5:
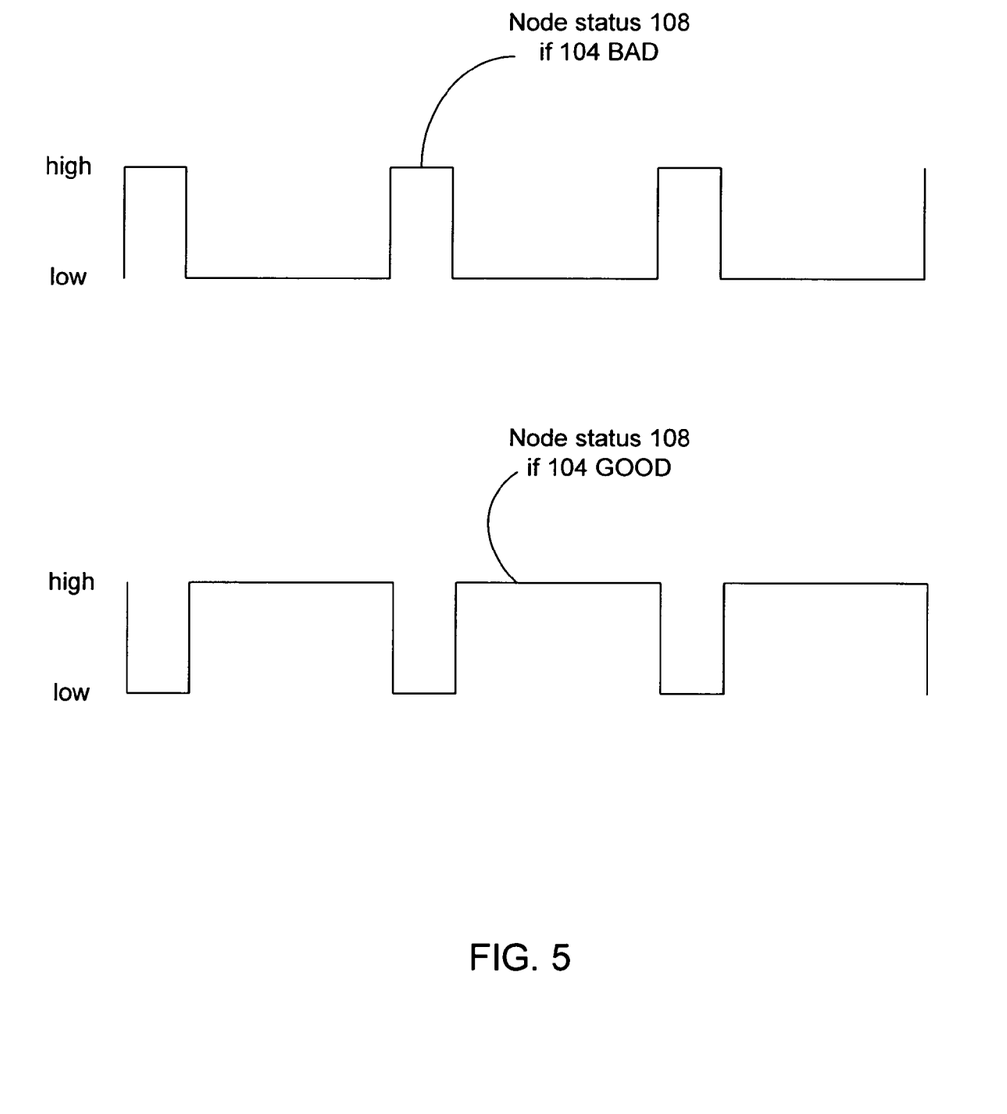
FIG. 5 depicts timing diagrams of the node status signal in accordance with an embodiment of the invention.

Exemplary timing diagrams of the node status signal 108 produced by the logical function block 304 are shown in FIG. 5. For these timing diagrams, the logical function block 304 is an XOR gate, and the signals input into the XOR gate are the signals (104 and 204) depicted in FIG. 4.

First, consider the node status signal 108 produced when the subsystem status signal 104 corresponds to a BAD state. In this case, the XOR gate receives the default BAD signal 204 and a low level for the subsystem status signal 104, and performs an exclusive-or operation on these two signals. The result is the node status signal 108 shown at the upper part of FIG. 5. In this instance, the node status signal 108 is a periodic signal representing a BAD state. More specifically, here, the node status signal 108 is of the same periodic form (toggling or pulse-modulated pattern, in this instance) as the default BAD signal 204.

Next, consider the node status signal 108 produced when the subsystem status signal 104 corresponds to a GOOD state. In this case, the XOR gate receives the default BAD signal 204 and a high level for the subsystem status signal 104, and performs an exclusive-or operation on these two signals. The result is the node status signal 108 shown at the lower part of FIG. 5. In this instance, the node status signal 108 is a periodic signal representing a GOOD state. More specifically, here, the node status signal 108 is a different periodic signal which is a complement of the default BAD signal 204.

Figure 6:
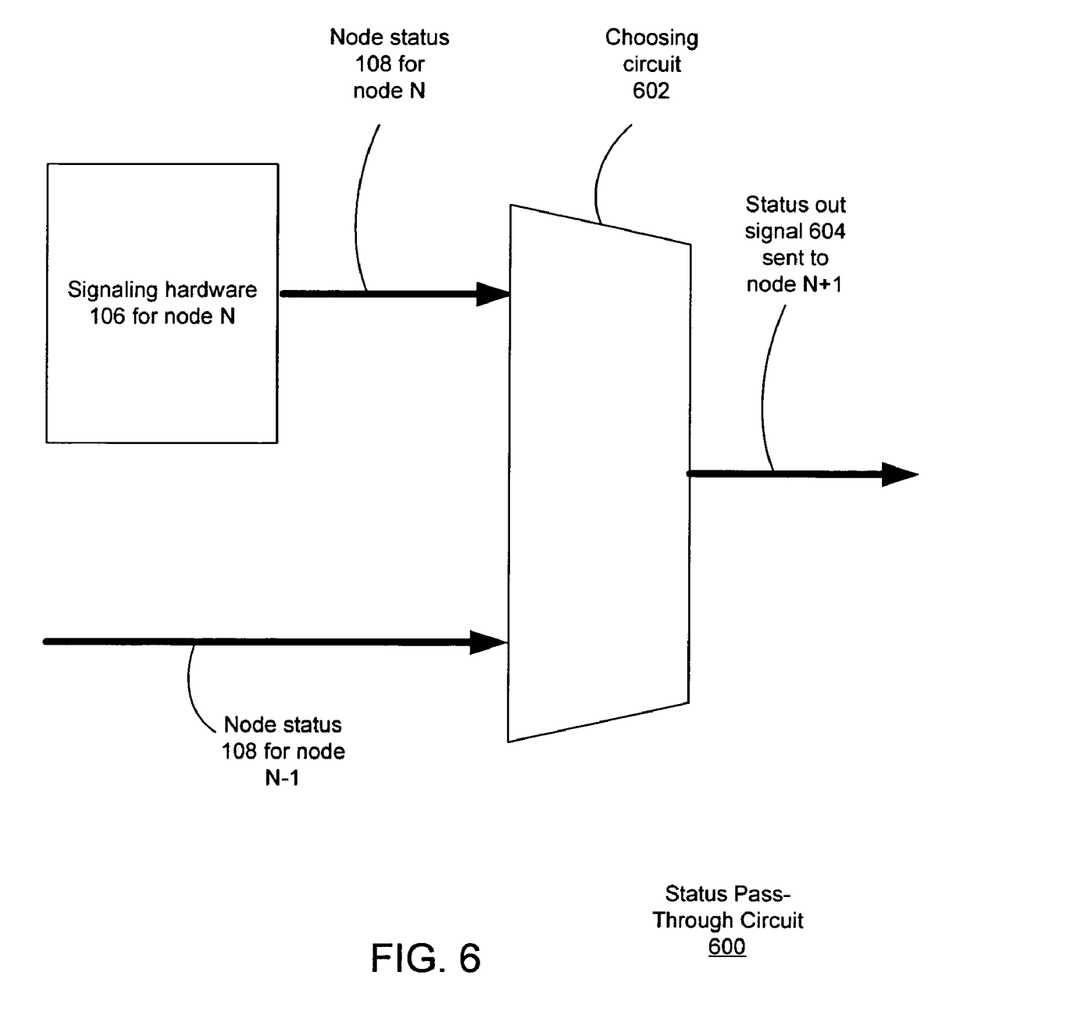
FIG. 6 is a schematic diagram of a status pass-through circuit in accordance with an embodiment of the invention.

FIG. 6 is a schematic diagram of a status pass-through circuit 600 in accordance with an embodiment of the invention. This circuit 600 advantageously allows a node status signal 108 for a preceding node to pass through a current node if the current node is down.

The signaling hardware 106 for node N produces the node status signal 108 for node N. For example, the signaling hardware 106 and node status signals 108 may be as described above in relation to the preceding figures.

A choosing circuit 602 receives the node status signal 108 for node N. In addition, the node status signal 108 from node N−1 (another node in the cluster) is received by the choosing circuit 602. The choosing circuit 602 operates on the two signals and produces a status out signal 604 that is transmitted to node N+1 (the next node in the cluster). In one embodiment the choosing circuit 602 may comprise a multiplexer (MUX) that selects one of the two status signals to pass on (via the status out signal 604) to the next node. If the computational subsystem (computational element) of node N has previously been removed from the cluster (for example, due to node failure, maintenance, or other reasons), then the status from node N−1 is passed. If the computational subsystem of node N is presently in use by the cluster, then the status of node N is passed. In this way, even if node N is down, the status of node N−1 is advantageously still evaluated by the system.

Note that if node N−1 is down, then the status signal received from node N−1 may originate from node N−2. If nodes N−1 and N−2 are both down, then the status signal received from node N−1 may originate from node N−3. And so on.

Figure 7:
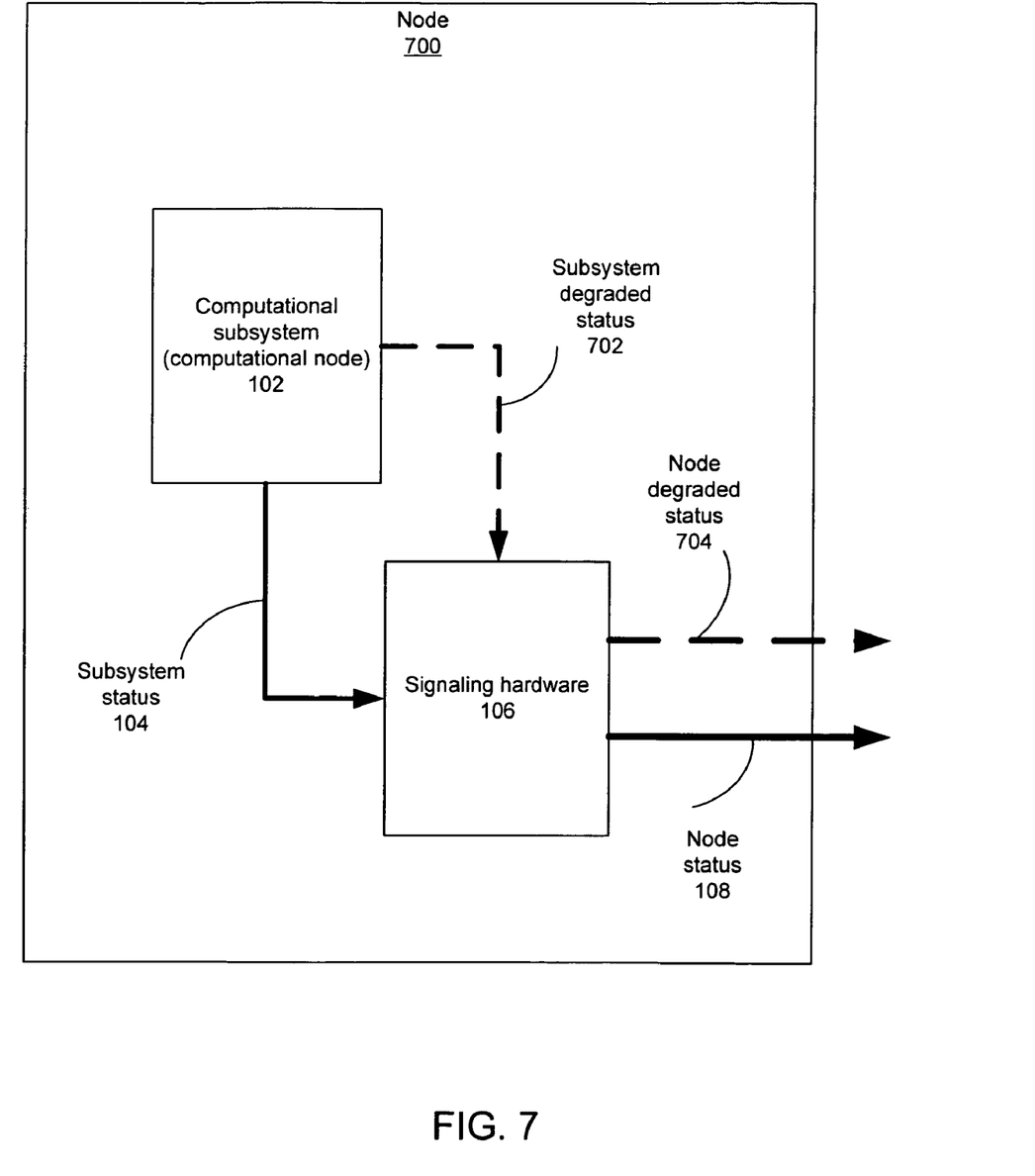
FIG. 7 is a schematic diagram of a node of a cluster in accordance with another embodiment of the invention.

FIG. 7 is a schematic diagram of a node 700 of a cluster in accordance with another embodiment of the invention. The node 700 in FIG. 7 is similar to the node 100 in FIG. 1. However, here, the node 700 generates a subsystem degraded status signal 702 in addition to the conventional subsystem status signal 104. In combination with the conventional subsystem status signal 104, the subsystem degraded status signal 702 expands the reported state from a simple binary signal to a multi-state (three-state or more) signal.

For example, the subsystem degraded status signal 702 may indicate a DEGRADED state or NOT_DEGRADED state for the computational subsystem 102. A DEGRADED state may be defined as when one or more aspects of the node is not running "up to par," so that the node may possibly be removed from the HA cluster. For example, the following rules may be used.

Rule D1: Computational subsystem loses greater than 50% performance

Rule D2: Severe (one level below critical) chassis code received

Variations of these rules and additional rules may also be used to define a DEGRADED state depending on the specific system. For example, the percentage performance prior to a degraded state being entered may differ from 50%. It may be higher, such as 75%, or lower, such as 25%.

In accordance with one embodiment, the subsystem degraded status signal 702 may be a simple flag indicating that the node is either degraded or not. In other embodiments, there may be multiple levels of degradation. These multiple levels of degradation may be implemented using multi-bit encoding of the level of degradation. In other words, instead of having just a single DEGRADED state, multiple levels of degradation may be defined by the rules. Using multiple levels of degradation would advantageously provide the HA clustering software with additional information for its decision making process as to how to manage the nodes of the cluster. For example, the degradation level may depend on the percentage performance lost.

In accordance with one specific embodiment, the node degraded status signal 704 may comprise a set of lines that provide the degraded state digitally to the next node in the HA cluster. These lines may be pulled down with resistors. One implementation may be as follows. All logical zeroes on these digital lines may indicate the node is BAD. All logical ones on these lines may indicate the node is GOOD. Other values in between may indicate the degradation level of the node, with the higher values indicating greater functioning.

Figure 8:
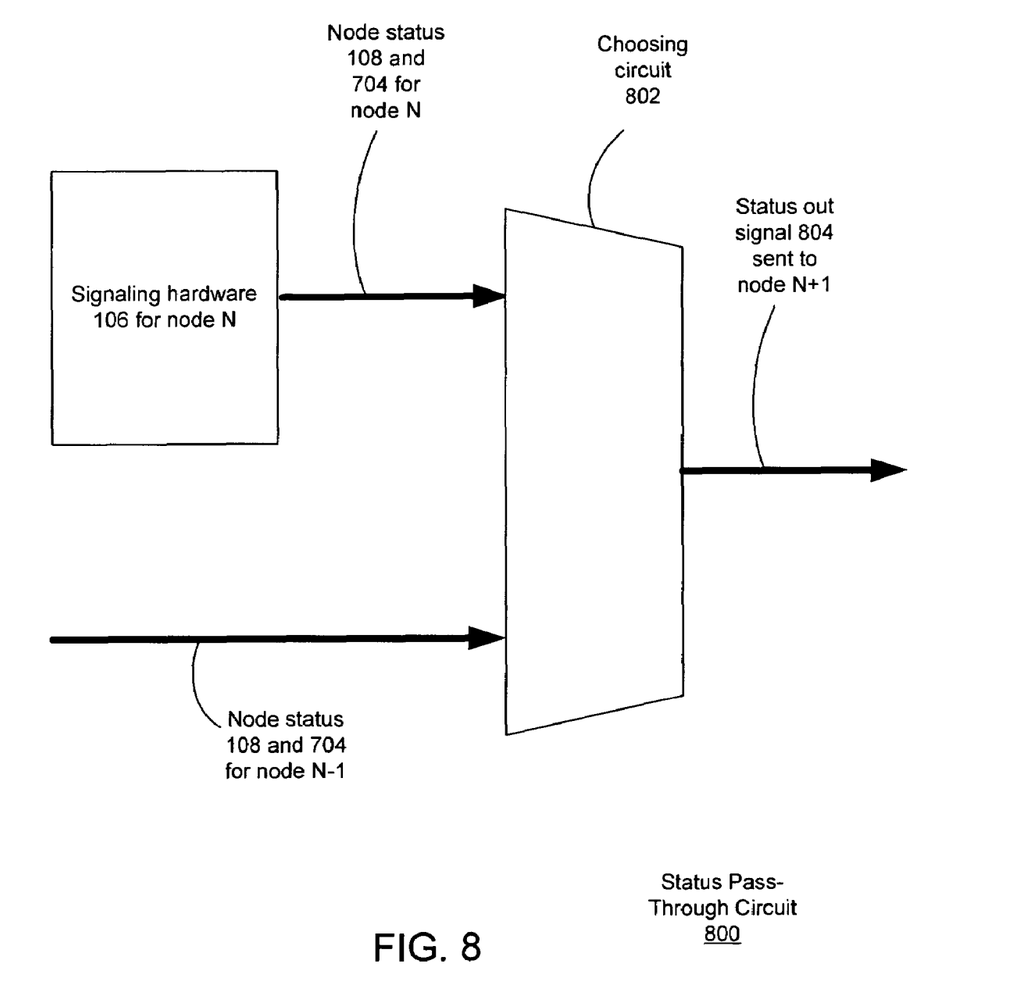
FIG. 8 is a schematic diagram of a status pass-through circuit in accordance with another embodiment of the invention.

FIG. 8 is a schematic diagram of a status pass-through circuit 800 in accordance with another embodiment of the invention. The circuit 800 in FIG. 8 is similar to the circuit 600 in FIG. 6. However, here, the choosing circuit 802 also receives the node degraded status signal 704 from nodes N and N−1.

The choosing circuit 802 operates on the input signals and produces a status out signal 804 including the additional degraded status information along with the GOOD/BAb status information from either node N or node N−1. Advantageously, this degraded status information may be utilized by the cluster level software as a "check" against the GOOD/BAD status information, resulting in a more reliable set of status information.

The above disclosure includes various advantages over the conventional art. First, the dedicated hardware is designed and used for the purpose of reliably transmitting the node status information to the cluster. This should improve the high-availability of the cluster. Second, a GOOD state is only transmitted when the appropriate software on the node is up and running and is able to signal a GOOD state. As a result, the hardware does not indicate a GOOD state when the software is down. Third, the above disclosure provides a solution to the problem of differentiating a "no heartbeat" because a node is down from a "lost heartbeat" due to a failed interconnect. This is done by providing the default BAD signal which may be modified to a GOOD signal by the working node. Fourth, the above disclosure provides a separate output for degraded type status signals, resulting in the reliable communication of such a degraded state. Moreover, the degraded status signal allows the cluster level software to use a "voting scheme" to quickly and accurately determine if a node is really down. For example, the voting scheme may utilize three signals, including the GOOD/BAD signal, the DEGRADED/NOT_DEGRADED signal, and the normal Ethernet connection provided by the cluster.

III. Apparatus for Node Removal and Communication with Cluster

There are circumstances where a node of an HA cluster is to be brought off line for physically performing maintenance or upgrades on the node. It is desirable to perform such maintenance without undue interruption of cluster operation. More particularly, it is desirable to be able to bring down and physically remove a node while maintaining the continuity of the nodes remaining present in the cluster.

However, in the above-discussed improved architecture for node status and communication, node status signaling is performed with dedicated links in a looped point-to-point topology. Maintaining continuity in such an architecture requires that, even when a node is taken off line and physically removed and manipulated for maintenance or upgrades, the HA cluster hardware interface for that node remains present within the cluster.

Figure 9:
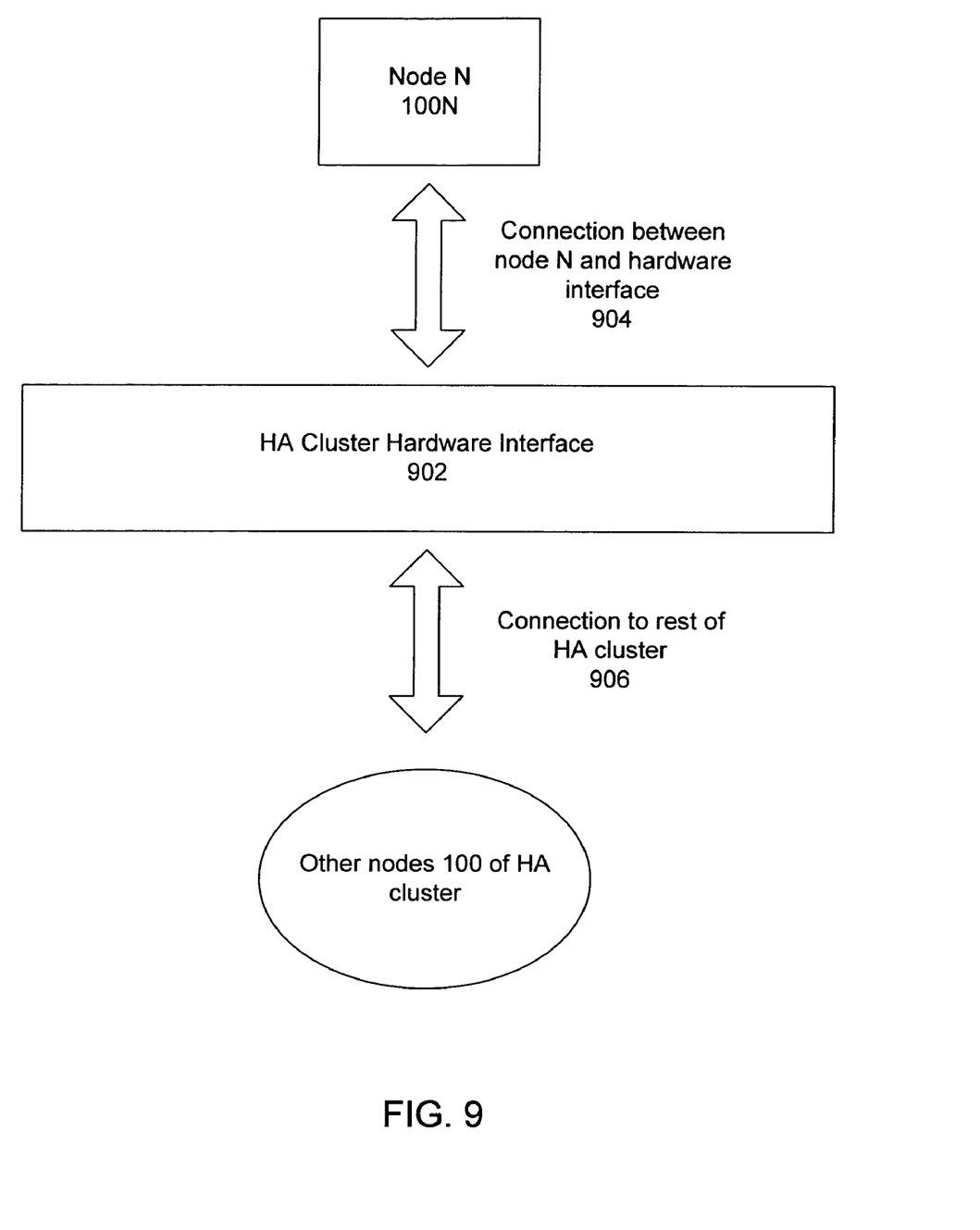
FIG. 9 is a high-level diagram of an apparatus for node removal and communication with other nodes in accordance with an embodiment of the invention.

FIG. 9 is a high-level diagram of an apparatus for node removal and communication with other nodes in accordance with an embodiment of the invention. The apparatus includes an HA cluster hardware interface 902. Connection hardware 904 is included between each particular node N 100N and the hardware interface 902. In addition, connection hardware 906 is included between the hardware interface 902 and the other nodes 100 of the HA cluster.

Figure 10:
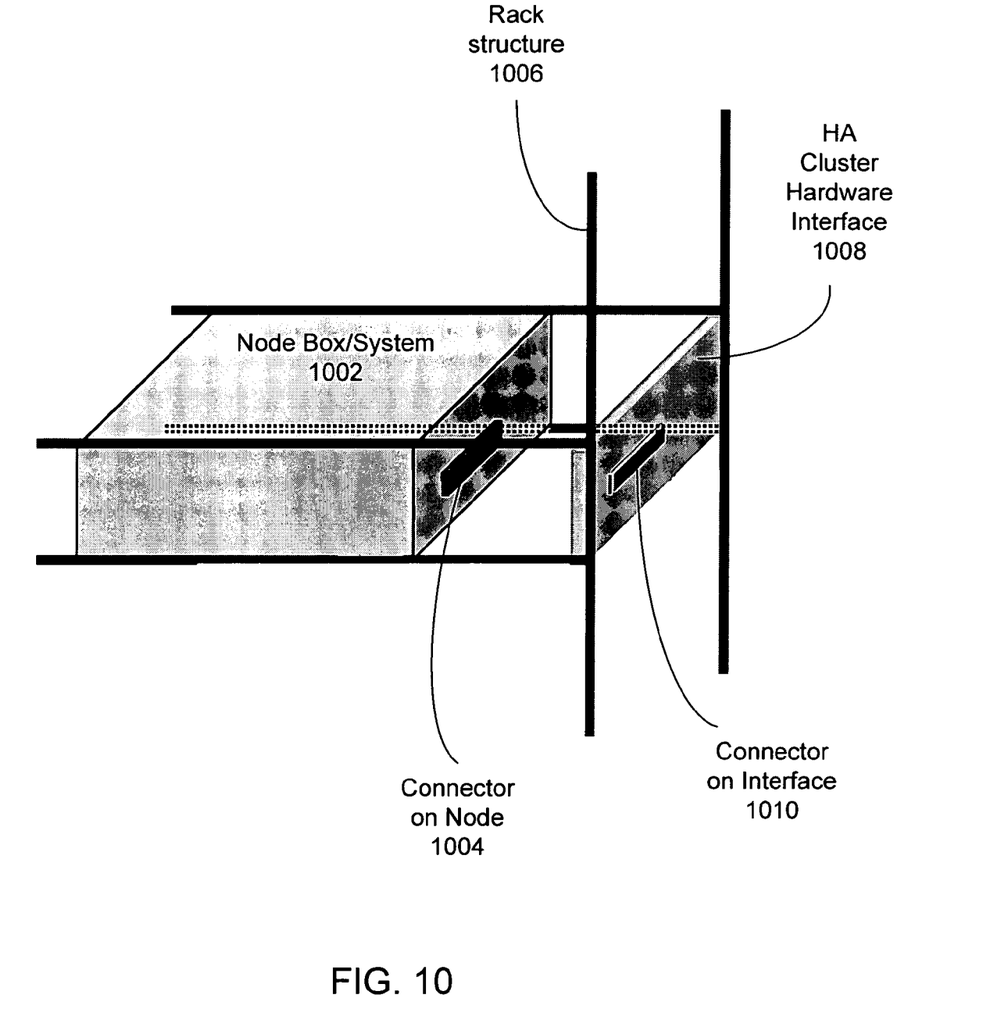
FIG. 10 is a schematic diagram of a rack-based implementation in accordance with an embodiment of the invention.

FIG. 10 is a schematic diagram of one implementation of an apparatus for node removal and communication with other nodes in accordance with an embodiment of the invention. As shown, a node 100 is housed in a node box/system 1002. The node box/system 1002 includes a connector 1004. The node box/system 1002 is configured such that the connector 1004 passes the node status signaling. In addition, power and/or other signaling may also be passed via the connector 1004.

A rack mechanical infrastructure (rack structure) 1006 (including interconnected vertical and horizontal members) receives and physically supports node box/system 1002. The rack structure 1006 also supports and incorporates the HA cluster hardware interface 1008. The hardware interface 1008 includes a connector 1010. The connector 1004 on the box/system 1002 mates with a connector 1010 on the hardware interface 1008.

With further reference to FIG. 10, it can be seen that the HA cluster hardware interface 1008 and the node 100 are designed to be physically separate. The chassis 1002 for the node 100 may be removed without removing the hardware interface 1008. This allows the hardware interface 1008 to remain connected in the HA cluster, thus providing continuity in the point-to-point looped communication described above.

In one embodiment, the HA cluster hardware interface 1008 may be implemented as a printed circuit board directly mounted to the rack. In another embodiment, the HA cluster hardware interface 1008 may be implemented as another chassis (preferably less deep than the node chassis) that is physically mounted to the rack.

In FIG. 10, the HA cluster hardware interface 1008 is depicted as spanning the entire width of the rack and the entire height of the node chassis. In an alternative embodiment, the HA cluster hardware interface 1008 may be implemented to extend only part way across the width of the rack and/or across the height of the node chassis. Such an implementation may advantageously allow space for the node chassis to have other connections out of the back of the rack that do not pass through the HA cluster hardware interface 1008.

Figure 11:
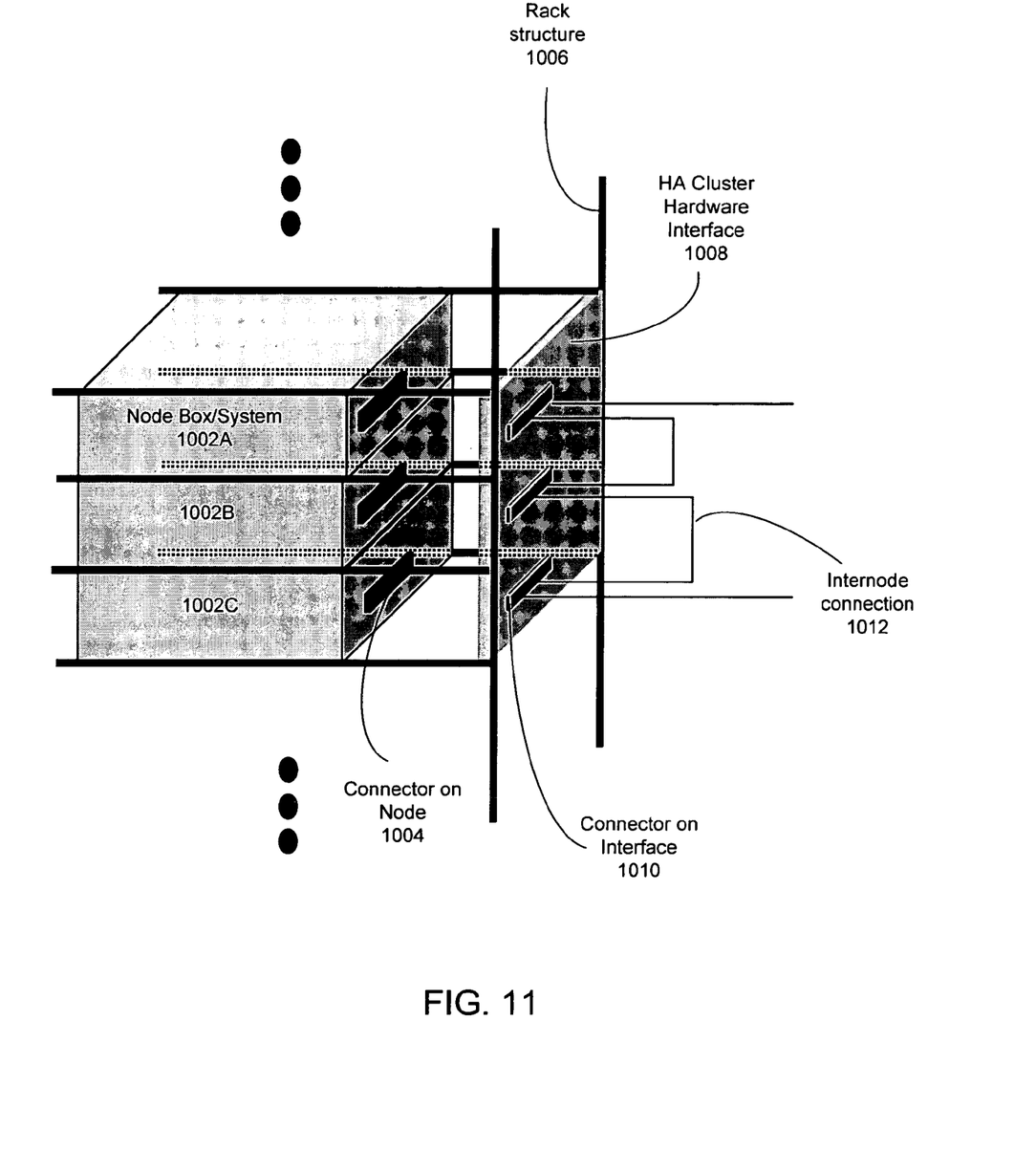
FIG. 11 is a schematic diagram of the rack-based implementation showing multiple node boxes in accordance with an embodiment of the invention.

FIG. 11 is a schematic diagram of a full rack level implementation including multiple node boxes in accordance with an embodiment of the invention. As shown, multiple nodes 100 are each housed in a node box/system 1002. Although three nodes (A, B, and C) are illustrated, the number of nodes may be more than three or less than three. Each node box/system 1002 includes a connector 1004 that is utilized for passing node status signaling, and possibly power and/or other signals.

The rack structure 1006 in FIG. 11 is shown configured with horizontal structures for multiple rack slots to receive and physically support the multiple node box/systems 1002. Multiple connectors 1010 on the HA cluster hardware interface 1008 are shown, where each rack slot has one such connector 1010. Each connector 1004 of a box/system 1002 mates with a corresponding connector 1010 on the hardware interface 1008.

In addition, "internode" connections 1012 between the connectors 1010 of the hardware interface 1008 are included. These connections 1012 may be preferably configured to interconnect adjacent ones of the connectors 1010 so as to form a chain that is closed into a loop by providing another connection 1012 (not illustrated) between the two ends of the chain.

Advantageously, when a node is removed for maintenance or upgrading, the chain of connections 1012 is not broken. Instead, the nodes on the chain on either side of the removed node become connected to each other. Similarly, if two or more adjacent nodes on the chain are removed, then the nodes on either side of the removed nodes become connected to each other.

In one possible embodiment, the HA cluster hardware interface 1008 may comprise a plurality of separate printed circuit boards, each board may be like the one illustrated in FIG. 10. In a preferred embodiment, the HA cluster hardware interface 1008 may comprise a relatively large printed circuit board (backplane) that provides the hardware interface for multiple cluster nodes.

One embodiment of the rack structure 1006 may comprise a standard rack, where the HA cluster hardware interfaces 1008 are retrofitted into the rack. In another embodiment, the rack structure 1006 may comprise a specially-designed clustering rack. The specially-designed clustering rack may be configured to easily house the node and hardware interface assemblies. In addition, the specially-designed clustering rack may be configured with facilities to optimally route the node status signals and/or other signals in the appropriate point-to-point configuration.

The above-described embodiments advantageously disclose apparatus that enable physical removal or repositioning of an HA cluster node for maintenance or upgrades, while still maintaining the continuity of the node status signaling loop of the cluster. Included is an HA cluster hardware interface and robust connections between the hardware interface and each of the cluster nodes.

The above-described embodiments also advantageously disclose rack structures that enables the HA cluster to be implemented within the rack ("HA cluster in a rack"). Extensions may be implemented to allow hot plugging of HA nodes into an HA cluster.

In the above description, numerous specific details are given to provide a thorough understanding of embodiments of the invention. However, the above description of illustrated embodiments of the invention is not intended to be exhaustive or to limit the invention to the precise forms disclosed. One skilled in the relevant art will recognize that the invention can be practiced without one or more of the specific details, or with other methods, components, etc. In other instances, well-known structures or operations are not shown or described in detail to avoid obscuring aspects of the invention. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the claims. Rather, the scope of the invention is to be determined by the following claims, which are to be construed in accordance with established doctrines of claim interpretation.

What is claimed is:

1. A high-availability cluster apparatus, the apparatus comprising:
    a plurality of computing nodes of said cluster;
    a hardware interface configured to connect to each of the nodes, wherein the hardware interface comprises a printed circuit board;
    internode connections coupled to the hardware interface to communicate node status signals between said nodes by communicating the node status signals through the hardware interface and the internode connections, which form a topological continuity that is dedicated for communicating the node status signals, to the nodes;
    a data communication network interconnecting the nodes;
    a cluster service comprising a collection of software on each of the computing nodes that manage cluster-related activity such that said plurality of computing nodes are used as a single computing unit,
    wherein a node is removable from being connected to the hardware interface without interrupting the topological continuity, and
    wherein the network is separate from the internode connections, and
    wherein the internode connections form a point-to-point topology.

2. The apparatus of claim 1, wherein each said computing node is housed in a chassis.

3. The apparatus of claim 2, wherein the hardware interface is mounted on a rack.

4. The apparatus of claim 3, wherein the hardware interface is housed in a separate chassis.

5. The apparatus of claim 3, wherein the rack is configured to support a plurality of the chassis.

6. The apparatus of claim 1, further comprising:
    a first connector configured on each of the nodes; and
    at least one second connector on the hardware interface;
    wherein the first connector is configured to mate with the second connector.

7. A method of communicating a node status signal between nodes of a high-availability computing cluster, the method comprising:
    receiving the node status signal from a first node by a first internode hardware connector on a hardware interface;
    forwarding the node status signal from the first connector to a second internode hardware connector on the hardware interface; and
    transmitting the node status signal from the second connector to a second node,
    wherein the node status signal is communicated on a network includes the hardware interface, the internode connectors and a printed circuit board, and wherein the network is dedicated for only communicating the node status signal, and
    wherein a cluster service comprising a collection of software on each said node manages cluster-related activity such that said nodes are used as a single computing unit;
    wherein the node topology comprises a point-to-point loop topology; and
    wherein a node is removable from being connected to the hardware interface without interrupting the topological continuity.

8. The method of claim 7, wherein a node topology for communication of the node status signal is configurable with an intermediate node positioned between the first and second nodes, wherein the intermediate node was removed from the cluster, and wherein the forwarding comprises:

transmitting the node status signal from the first connector to an intermediate connector corresponding to the intermediate node; and transmitting the node status signal from the intermediate connector to the second connector.

9. The method of claim 7, wherein the hardware interface is mounted on a rack and wherein the rack is configured to support a plurality of nodes.

10. The method of claim 7, wherein the hardware interface comprises the printed circuit board.

11. The method of claim 7, wherein the hardware interface is housed in a separate chassis.

12. The method of claim 7, wherein the node status signal includes at least a good/bad type status indication.

13. A hardware interface configured to communicate a node status signal between nodes of a high-availability computing cluster, the hardware interface comprising:

a plurality of internode connectors, each connector configured to communicate the node status signal with a corresponding node; and a dedicated network that includes the internode connectors configured to only transmit the node status signal between the connectors in a point-to-point loop configuration;

wherein the dedicated network includes a printed circuit board, and wherein a cluster service comprising a collection of software on each of the nodes manage cluster-related activity such that the nodes are used as a single computing unit;

wherein the hardware interface is configured such that a node is removable from the cluster without interrupting continuity of the node status signal transmission; and wherein the hardware interface is implemented using the printed circuit board with the internode connectors mounted thereon.

14. The hardware interface of claim 13, wherein the hardware interface is mounted onto a rack, and wherein a plurality of nodes is mountable onto the rack.

15. The hardware interface of claim 13, wherein the hardware interface is implemented using a chassis with the connectors mounted thereon.

* * * * *

UNITED STATES PATENT AND TRADEMARK OFFICE
CERTIFICATE OF CORRECTION

| | | |
|---|---|---|
| PATENT NO. | : 7,664,994 B2 | Page 1 of 1 |
| APPLICATION NO. | : 10/935882 | |
| DATED | : February 16, 2010 | |
| INVENTOR(S) | : Ken Gary Pomaranski et al. | |

It is certified that error appears in the above-identified patent and that said Letters Patent is hereby corrected as shown below:

In column 11, line 13, in Claim 9, delete "of" and insert -- of the --, therefor.

Signed and Sealed this

Twenty-seventh Day of July, 2010

David J. Kappos
*Director of the United States Patent and Trademark Office*